May 24, 1966   G. F. QUAYLE   3,252,545
INDUSTRIAL TRUCK
Original Filed Jan. 9, 1963   8 Sheets-Sheet 2

Fig.3.

INVENTOR.
GEORGE F. QUAYLE
BY
A. H. Golden
ATTORNEY

May 24, 1966 G. F. QUAYLE 3,252,545
INDUSTRIAL TRUCK

Original Filed Jan. 9, 1963 8 Sheets-Sheet 4

INVENTOR.
GEORGE F. QUAYLE
BY
A. H. Golden
ATTORNEY

May 24, 1966 G. F. QUAYLE 3,252,545
INDUSTRIAL TRUCK
Original Filed Jan. 9, 1963 8 Sheets-Sheet 6

INVENTOR.
GEORGE F. QUAYLE
BY
ATTORNEY

May 24, 1966  G. F. QUAYLE  3,252,545
INDUSTRIAL TRUCK
Original Filed Jan. 9, 1963  8 Sheets-Sheet 7

INVENTOR.
GEORGE F. QUAYLE
BY
ATTORNEY

United States Patent Office 3,252,545
Patented May 24, 1966

3,252,545
INDUSTRIAL TRUCK
George F. Quayle, Philadelphia, Pa., assignor, by mesne assignments, to Eaton Yale & Towne Inc., a corporation of Ohio
Continuation of application Ser. No. 250,339, Jan. 9, 1963. This application Feb. 27, 1963, Ser. No. 261,949
15 Claims. (Cl. 187—9)

This application is a continuation of my application, Serial No. 250,339, filed Jan. 9, 1963, entitled, "Industrial Truck," and now abandoned.

This invention relates to an industrial truck having extendible uprights, a lifting load carriage, and a ram for elevating the uprights and load carriage.

In trucks of this type, it is desirable that the load carriage have substantial "free lift," i.e., vertical movement without extension of the uprights. This allows the load carriage to be lifted without increasing the overall height of the truck, thereby permitting operation of the loaded truck in areas of low overhead.

It is also desirable that the ram be capable of fully extending the uprights and lifting the load carriage to the top of the fully extended uprights, without the top of the ram extending above the load carriage. This permits full utilization of the available length of the uprights for high lifting of the load.

This invention provides a relatively simple lifting arrangement whereby extension of a relatively short ram effects both substantial free lift of the load carriage, and full elevation of the uprights and the load carriage, without the top of the ram extending above the load carriage in the fully elevated position of the uprights and load carriage. This free lift and full lift is obtained in proper sequence regardless of the sequence in which the parts of the ram extend.

In accordance with the invention, the lift ram is mounted for bodily vertical movement relatively to the uprights and is connected through a lift chain with the load carriage and uprights in such a manner that initial extension of the ram effects free lift of the load carriage and further extension of the ram effects full elevation of the extendible uprights and load carriage for high lifting. The mounting of the ram for bodily vertical movement relatively to the uprights allows the ram to extend downwardly, relatively to the extendible uprights as the extendible uprights are elevated, so that the ram may extend fully to effect full elevation of the extendible uprights without the ram extending above the carriage.

As a feature of the invention, the upper and lower ends of the ram are guided on the uprights through guide members which are pivotally attached to the ends of the ram, so that the only forces exerted on the ram are axial forces. This minimizes ram wear and increases the effective life of the ram.

The lifting arrangement of the invention may be utilized on lift trucks incorporating three sets of telescoping uprights or trucks incorportaing only two sets of telescoping uprights.

When used on a truck incorporating three sets of uprights, initial extension of the lift ram effects free lift of the load carriage, and further extension of the lift ram effects full elevation of the load carriage and the secondary and tertiary uprights. The mounting of the ram for bodily vertical movement in a truck of this type allows the ram to extend in a downwardly direction relatively to the secondary uprights and tertiary uprights as these uprights are elevated, so that the ram may extend fully to effect full elevation of the load carriage and uprights, without the upper end of the ram extending above the upper end of the fully elevated uprights and load carriage.

As a feature of the invention, a latch arrangement is provided between the upper end of the ram and the tertiary uprights which serves to pull the tertiary uprights downwardly in the event that there is binding or sticking between the secondary uprights and the tertiary uprights during lowering of the uprights. As a further feature, a lost motion connection is provided between the lift chain and the tertiary uprights which applies a downward force on the lift chain as the tertiary uprights are initially lowered to ensure lowering of the ram bodily. This downward bodily movement of the ram is transmitted through a stop to the secondary uprights whereby the weight of the ram, tertiary uprights, and load is transmitted to the secondary uprights to ensure lowering of the secondary uprights.

When used on a truck incorporating only two sets of uprights, the invention ensures free lift and full lift in the proper sequence regardless of the sequence in which the parts of the ram extend, so that a very simple type of ram, in which the ram pistons all extend from the same end of the cylinder, may be used. The mounting of the lift ram for vertical bodily movement allows the ram to first extend in an upwardly direction to effect substantial free lift of the carriage and then to extend in a downwardly direction relatively to the secondary uprights to effect full lift of the secondary uprights, without the upper end of the ram extending above the load carriage.

As a feature of the invention, as incorporated in a truck having two sets of uprights, the lift chain is made in two parts. One part is secured at one end to the load carriage, extends over the sheave on the upper end of the ram and is anchored at the other end to the secondary uprights intermediate their ends, and the other part of the chain is anchored at one end to the secondary uprights, extends down around the sheave at the lower end of the ram and is anchored at the opposite end to the top of the primary uprights. This facilitates assembly of the chain and allows adjustments in the length of the parts of the chain to be easily made at the point of connection of the two parts with the secondary uprights.

The invention and its advantages having been broadly described, a more detailed description of two embodiments of the invention will be given hereafter by reference to the accompanying drawings, wherein:

FIG. 6 is a sectional view taken on the line 6—6 of FIG. 4;

3

FIG. 18 is similar to FIG. 17, but shows the uprights and load carriage fully elevated.

Figures 1, 2:
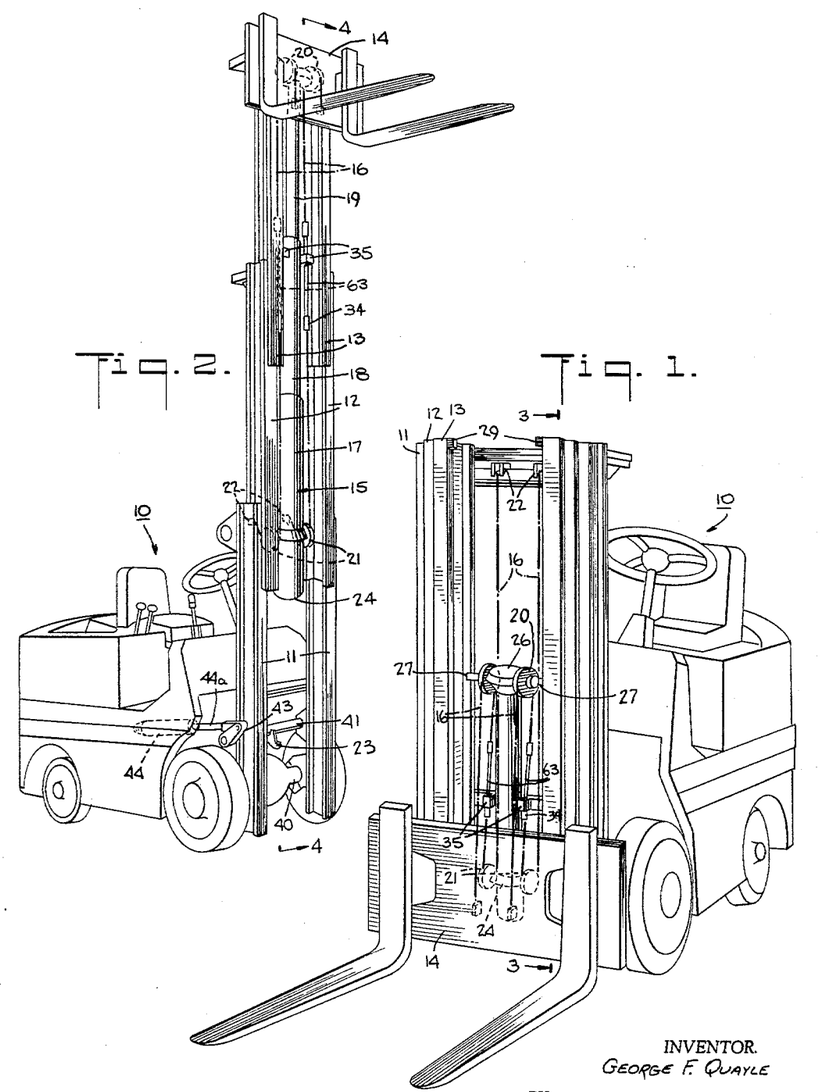
FIG. 1 is a perspective view of a truck constructed in accordance with the invention having three sets of uprights and showing the uprights and load carriage in the lowered position.
FIG. 2 is a perspective view similar to that of FIG. 1, but showing the uprights and load carrage in a fully elevated position.

Referring to the drawings and in particular to FIGS. 1 and 2 the invention is shown incorporated in an industrial truck 10 having three sets of telescoping uprights, including primary or stationary uprights 11 mounted on the truck frame, secondary uprights 12 mounted for vertical movement on the primary uprights, and tertiary uprights 13 mounted for vertical movement on the secondary uprights.

A load carriage 14 is mounted for vertical movement on the tertiary uprights 13, and, as will be described in detail hereafter, the load carriage 14 and the uprights 12 and 13 are adapted to be elevated from the position shown in FIG. 1 to the fully elevated position shown in FIG. 2 by means of a vertically extending lift ram 15 and lift chains 16.

The particular ram illustrated is a simple multiple piston ram, including, as shown in FIG. 2, a cylinder 17, a first telescoping tubular piston 18 and a second telescoping piston 19, which is slidably mounted in the tubular piston 18. As shown in FIG. 1, the ram 15 when unextended has an overall length substantially less than that of the lowered uprights.

The lift chains 16 are secured at one end to the load carriage 14, extend up around sheaves 20 mounted on the upper end of the innermost piston 19 of the ram 15, extend down around sheaves 21 secured to the cylinder 17 adjacent the lower end of the cylinder, and are anchored at the opposite end to brackets 22 which are secured to the top of the primary uprights.

In accordance with the invention, the ram 15 is not fixed to the uprights, but rather is mounted for bodily vertical movement relatively to the uprights. This contributes a number of advantages and particularly allows full extension of the lift ram 15 to effect full elevation of the load carriage 14 and the uprights, without the upper end of the ram extending above the load carriage in the fully elevated position of the load carriage. The action of the ram 15, as so mounted, in elevating the uprights and load carriage can be best seen in the sequence drawings of FIGS. 8-13.

Figure 8:
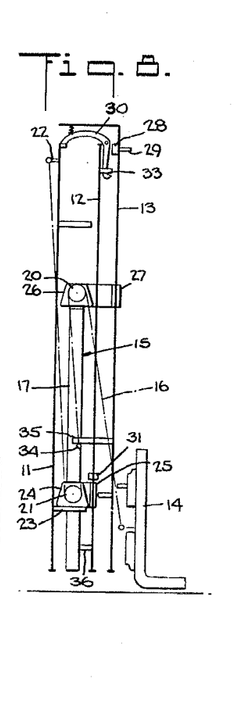
FIG. 8 is a schematic drawing of the uprights, load carriage, lift ram and lift chains of the truck shown in FIG. 1, showing the uprights and load carriage in the lowered position.

Referring first to FIG. 8, the uprights and the load carriage are shown in the lowered position. In this position of the uprights and ram, a stop member 23, which is secured to the primary uprights 11, and which is more fully shown in FIGS. 2, 3, 4 and 6, engages a stop surface on a bracket or header member 24 which is secured to the cylinder 17 of the ram 15. This arrangement prevents the ram 15 from dropping below the uprights when the uprights are in a lowered position. The header 24 also supports the sheaves 21 and has

Figure 3:
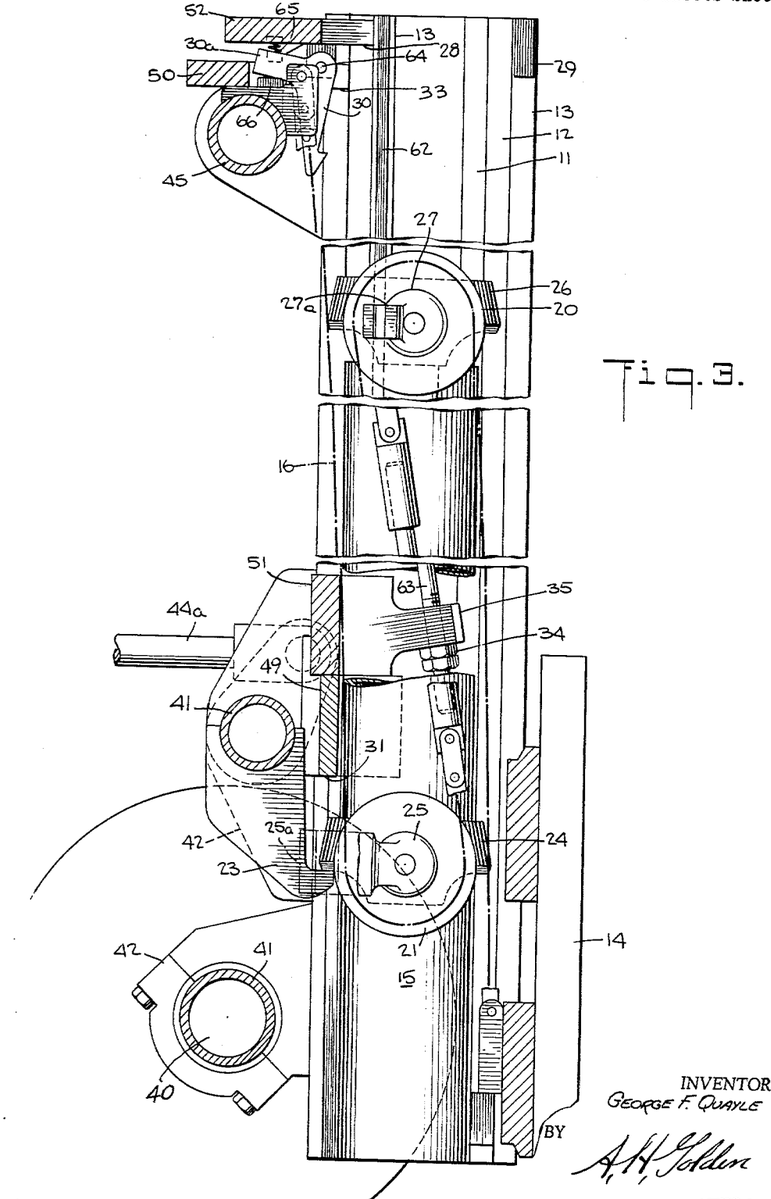
FIG. 3 is a sectional view taken on the line 3—3 of FIG. 1.

4 guide members 25, FIGS. 3 and 6, pivotally attached thereto and having portions 25a which slidably engage longitudinal portions 58 on the secondary uprights 12 to guide the lower end of the ram 15 during bodily vertical movement thereof relatively to the uprights.

Figure 5:
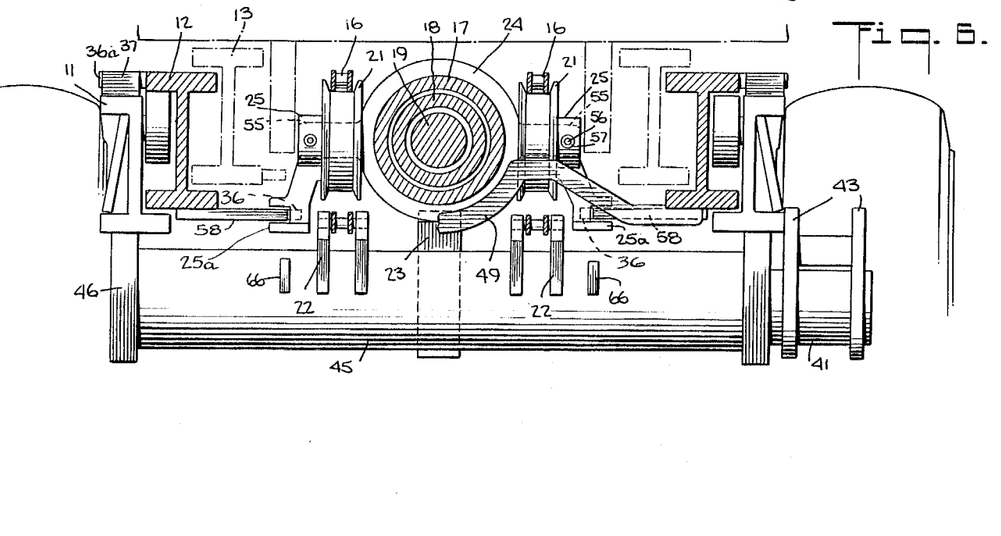
FIG. 5 is a top plan view of the uprights as shown in FIG. 4 with portions broken away.

The upper end of the inner piston 19 of the ram 15 is provided with a similar bracket or header member 26 shown schematically in FIG. 8 and more fully in FIGS. 1, 3 and 5, which supports the upper sheaves 20 and also has guide members 27 pivotally attached thereto. Members 27 has portions 27a which slidably engage longitudinal portions 62 on the tertiary uprights 13 to guide the upper end of the ram during bodily vertical movement of the ram and also extension of the pistons of the ram. The pivotal attachment of the guide members 25 and 27 to the headers 24 and 26 of the ram 15 prevents the guide members from applying an eccentric load to the ram. This minimizes wear of the ram.

Figure 7:
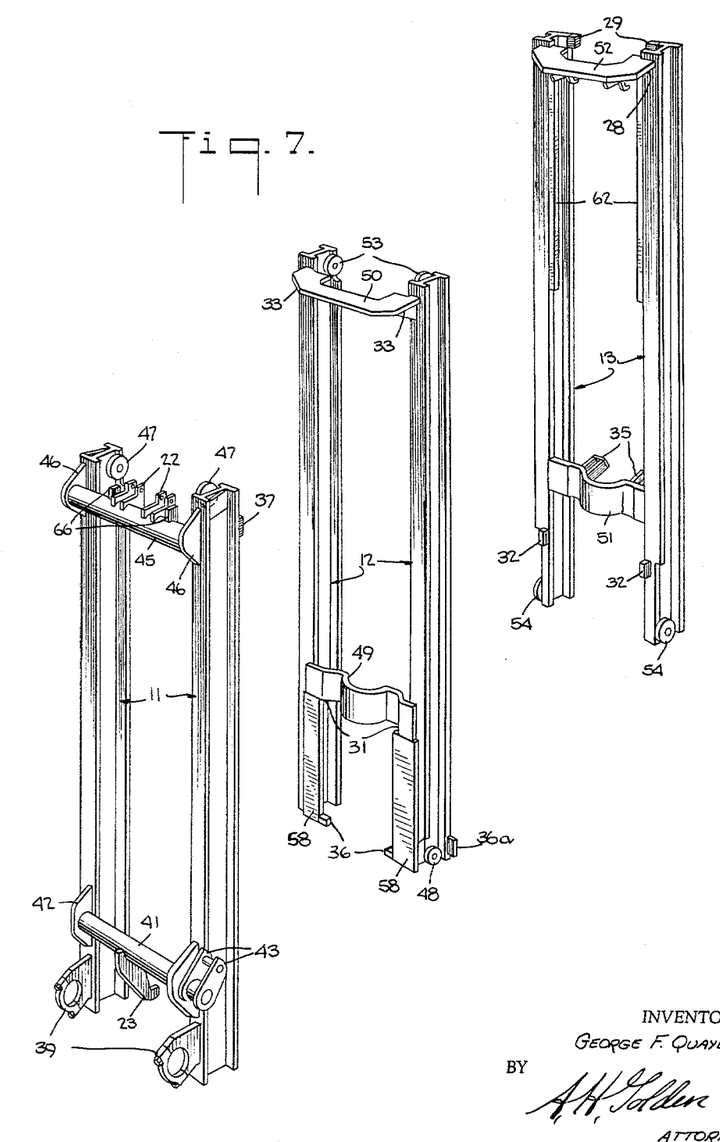
FIG. 7 is a perspective view of the uprights, as disassembled, to show the details of construction.
Figure 9:
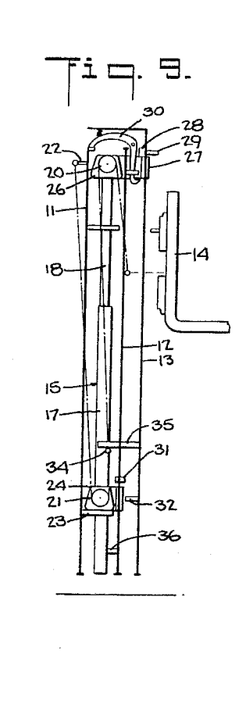
FIG. 9 is a drawing similar to FIG. 1, but showing the load carriage and lift ram after "free lift" of the load carriage.

On initial extension of the ram 15 from the FIG. 8 position the load carriage 14 is elevated relatively to the uprights through the chains 16 at twice the speed of extension of the ram, until the carriage reaches the position shown in FIG. 9. This represents the "free lift" position of the load carriage, inasmuch as neither the secondary uprights 12 nor the tertiary uprights 13 have been elevated at this point. In this FIG. 9 position of the ram, the upper guide member 27 on the ram contact stops 28 secured to the top of the tertiary uprights 13, those stops 28 comprising lower surfaces on a cross brace 52 as indicated in FIGS. 3 and 7. Thus, further extension of the ram 15 to the FIG. 10 position will effect lifting of the tertiary uprights 13 at the same speed that the ram 15 extends. At the same time, the chains 16 have continued to lift the load carriage at twice the speed of the ram, until the carriage 14 moves against stops 29 on the top of the tertiary uprights 13, as also shown in FIG. 10.

Moreover, when starting to lift from their FIG. 9 position, the tertiary uprights 13 will have caused a spring pressed latch member 30 to act. As better shown in FIG. 3, latch member 30 is pivoted on the upper end of the tertiary uprights 13, and at first is held in a non-latching position by contact of the outer end 30a thereof with a stop member 66 on a cross brace 45 for the upper end of the primary uprights 11. When tertiary uprights 13 rise, the latch member 30 will move into latching or locking position relatively to the header 26 which is mounted on the upper end of piston 19 of ram 15, the latching position of latch member 30 being indicated in FIGS. 4 and 10. If at this point, the upper end of the ram 15 should be lowered, the tertiary uprights 13 must move down with it.

Figure 4:
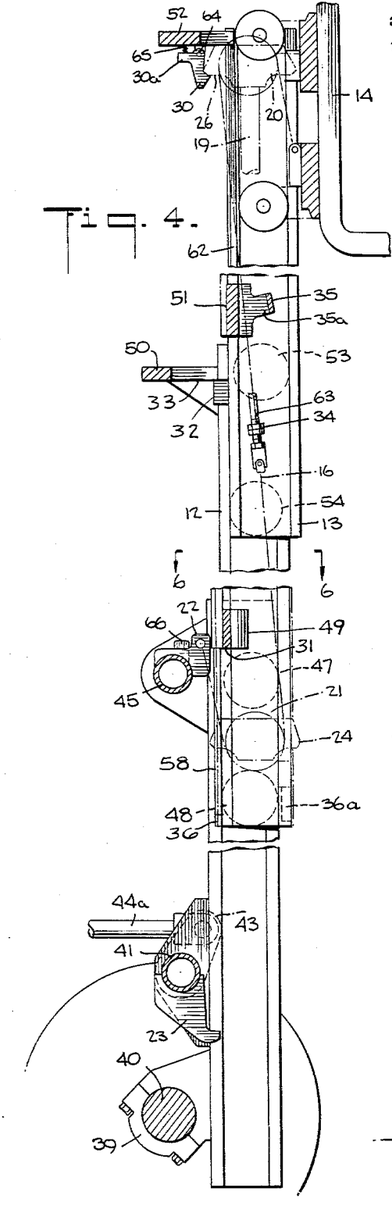
FIG. 4 is a sectional view taken on the line 4—4 of FIG. 2.
Figures 10, 11:
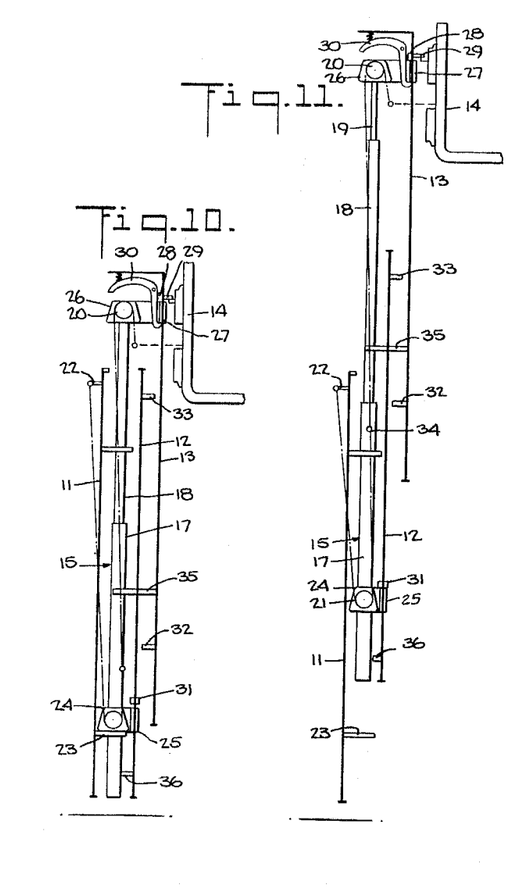
FIG. 10 is similar to FIG. 9, but shows the secondary uprights partially elevated.
FIG. 11 is similar to FIG. 10, but shows both the tertiary uprights and the secondary uprights partially elevated.

Once the tertiary uprights 13 move upwardly to their FIG. 10 position, further extension of ram 15 will effect lifting of those uprights and carriage as a unit. Since the load carriage 14 no longer can move upwardly relatively to tertiary uprights 13, the ram 15 no longer can move the chains 16 in carriage lifting direction over the upper sheaves 20. Therefore, further upward extension of the ram acts through chains 16 against the lower sheaves 21 to lift the ram 15 bodily, as indicated in FIG. 11, the ram moving away from its support member 23 on primary uprights 11. By that bodily upward movement, the ram 15 will act for a time to lift the secondary uprights 12 through engagement of the lower guide members 25 on the ram with stops 31 on the secondary uprights 12. Those stops 31 may incidentally comprise lower surfaces on a crossbrace 49 for the secondary uprights 12, as indicated in FIGS. 3, 4 and 7. Thus, the load carriage 14 and tertiary uprights 13 now move upwardly at a speed which is the extending speed of the ram added to the speed at which the ram moves bodily upward, while the secondary uprights 12 rise merely at the same speed at which the ram 15 moves bodily upward.

Figure 12:
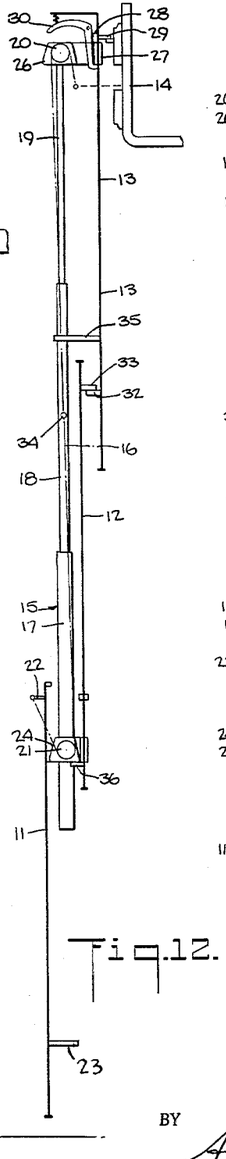
FIG. 12 is similar to FIG. 11, but shows the tertiary uprights, secondary uprights and load cariage fully elevated.

Due to this difference in speed of the tertiary uprights 13 and the secondary uprights 12, still further extension of the ram 15 results in the tertiary uprights picking up the secondary uprights through engagement of stops 32 on the lower end of the tertiary uprights 13, with stops 33 on the upper ends of the secondary uprights 12, as shown in FIG. 12. Stops 32 and 33 may be seen in more detail in FIGS. 4 and 7. The secondary uprights 12 are then lifted by the tertiary uprights 13, instead of by the guide members 25 on the ram 15.

It should be pointed out that the stop 31 on the lower end of the secondary uprights 12, through which the lower header 24 of the ram 15 directly lifts the secondary uprights 12 until the secondary uprights are picked up by the tertiary uprights 13, may be eliminated. If the stops 31 are eliminated, the secondary uprights 12 will merely be lifted in the manner that is indicated in FIG. 12, those uprights 12 having remained stationary until they are picked up by the tertiary uprights 13 through engagement of the stops 32 on the tertiary uprights 13 with the stops 33 on the secondary uprights. The provision of the stops 31 on the secondary uprights 12, through which the ram 15 directly elevates the secondary uprights 12, FIG. 11 until the secondary uprights 12 are picked up and elevated by the tertiary uprights FIG. 12, does have the advantage that it allows the guide portions on the secondary uprights 12 which are slidably engaged by the guide members 25 of the ram 15 to be shorter, than would be the case if the stops 31 are eliminated.

After the stops 32 on the low end of the tertiary uprights 13 engage the stops 33 on the upper end of the secondary uprights, the secondary and tertiary uprights 12 and 13 and the carriage 14 are elevated as a unit through further extension of the ram 15, until they reach the fully extended position shown in FIG. 12. This further extension of the ram 15 is made possible through the mounting of the ram for bodily vertical movement relatively to the uprights, which permits the ram 15 to extend in a downwardly direction relatively to the secondary and tertiary uprights 12 and 13 while the secondary and tertiary uprights are being elevated. This downwardly extension of the ram 15 can be seen in FIG. 12 wherein the ram 15 has extended downwardly relatively to the uprights 12 and 13 so that the lower end of the ram cylinder 17 extends below the lower end of the secondary uprights 12.

It will be noted that had the cylinder 17 of the ram 15 been fixed to the secondary uprights 12, the ram could not be extended sufficiently to lift the carriage 14 and the uprights 12 and 13 to the fully elevated position shown in FIG. 2, unless the upper end of the ram were allowed to extend above the load carriage 14 in the fully elevated position. This would, of course, reduce the effective height of lift of the truck. Additionally, it would make impossible the latching of the upper end of the ram 15 to the tertiary uprights 13.

Figure 13:
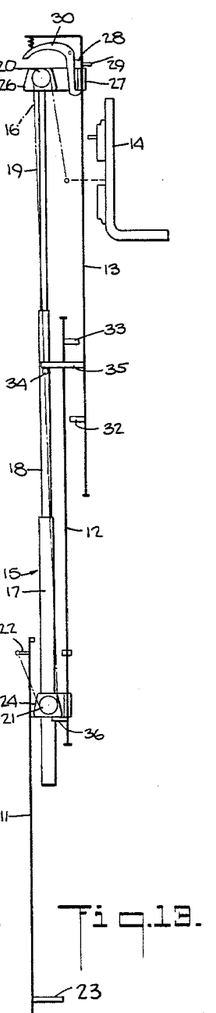
FIG. 13 is similar to FIG. 12, but showing the secondary uprights, tertiary uprights and the load carriage in a partially lowered position.

To lower the load carriage and uprights from the fully elevated position of FIG. 12, the fluid pressure in the ram 15 is released so that the ram may contract. As the ram 15 contracts, the tertiary uprights 13, being latched to the upper end of the ram 15, are pulled downwardly by the ram. Normally, the secondary uprights 12 will move downwardly with the tertiary uprights 13, since the operating sequence with which the parts move downwardly will merely be the reverse of the lifting sequence. However, in FIG. 13, I show what happens if the secondary uprights 12 should fail to move down due to binding relatively to the primary uprights 11. Then, the load carriage 14 will be lowered somewhat relatively to the tertiary uprights 13 as those uprights move downwardly, until stops 35 on the teritary uprights 13 move against stops 34 that are attached to the chains 16, as shown in FIG. 13. Those stops 34 and 35 are more fully shown in FIGS. 1, 3 and 4. At this point, further lowering of the load carriage 14 relatively to the tertiary uprights 13 is prevented, and at the same time, the weight of the tertiary uprights 13, and the load on the carriage 14 is transmitted to the upper end of the ram 15, and through the ram 15 to the secondary uprights 12, by engagement of the lower guide member 25 of the ram with stops 36 on the lower end of the secondary uprights 12, thereby forcing the secondary uprights 12 downwardly. Stops 36 may conveniently be mounted on the vertical plate portions 58 of secondary uprights 12, as indicated in FIGS. 4, 6 and 7. It will be understood that the particular operation shown in FIG. 13 need take place only when there is sticking or binding between the secondary uprights 12 and the primary uprights 11. If there is no such binding, the stops 34 on the chain 16 and stops 35 on the tertiary uprights 13 will not come into play, and the load carriage 14 will merely move with the tertiary uprights 13, remaining at the top of those uprights as they are lowered from their FIG. 12 to their FIG. 10 position.

From the FIG. 10 position, the downward movement of the secondary uprights 12 and tertiary uprights 13 continues, with the load carriage moving at a faster rate until the secondary and tertiary uprights 12 and 13, and the load carriage 14 reach the position shown in FIG. 9. At this time, the latch member 30 engages the upper end of the primary uprights 11, releasing the latch 30 from the upper end of the ram 15 so that the ram 15 can contract further to allow the load carriage 14 to lower to the initial position shown in FIG. 8.

Thus, it can be seen from the sequence drawings of FIGS. 8–13, that by mounting of the lift ram 15 for bodily vertical movement in accordance with the invention, substantial free lift of the load carriage and full elevation of the uprights and load carriage 14 is obtained. It is also to be noted that the uprights and carriage are elevated in the proper sequence, regardless of the sequence in which the parts of the ram extend. For this reason, a simple type ram, as illustrated, in which the pistons all extend from the same end of the ram cylinder may be used.

Referring now to FIGS. 1–7, which show the details of construction of the truck, the primary uprights 11 are mounted on the front axle 40 of the truck, best shown in FIGS. 3 and 4, through suitable bearings 39, best shown in FIG. 7, which are welded, or otherwise secured, to the uprights 11 adjacent the lower ends. This allows the uprights to be tilted slightly in the fore and aft direction of the truck, to facilitate engagement of a load by the load carriage 14, and to stabilize a load on the carriage.

Referring to FIG. 7, a horizontally extending tubular cross brace 41 is secured to the back of the uprights 11, through brackets 42, in a position slightly above the bearings 39, and a pair of arms 43 are rigidly secured to the end of the cross brace 41. A piston rod 44a of a tilt ram 44, shown in FIG. 2, is pivotally attached to the arms 43 so that the uprights 11 may be tilted slightly in the fore and aft direction of the truck, around the front truck axle 40, by operation of the ram 44.

As shown in FIGS. 7, 3 and 4, the stops 23, which as previously described, prevent the ram 15 from dropping below the uprights, when the uprights and load carriage are in the lowered position, is welded, or otherwise secured, to the cross brace 41 in a position to engage the lower surface of the header member 24, as shown in FIG. 3.

Referring to FIGS. 7 and 4, a horizontally extending tubular cross brace 45 is also secured to the back of the primary uprights 11, adjacent the upper ends thereof, through brackets 46, and the brackets 22 through which the end of the lift chains 16 are anchored to the upper ends of the primary uprights 11, are welded, or otherwise secured, to the cross brace 45 between the brackets 46.

As best seen in FIG. 7, the secondary uprights 12 are mounted for vertical movement on the primary uprights 11 in the well known manner through rollers 47 which are secured to the upper ends of the primary uprights 11 and rollers 48 which are secured to the lower end of the secondary uprights 12 and ride in opposed channels of the uprights.

The secondary uprights 12 are provided with a cross brace 49 adjacent the lower ends thereof, which is suitably curved to extend around the lift ram 15, and are also provided with a cross brace 50 at the upper ends thereof. The stop 37 on the primary uprights 11 and the stop 36a on the secondary uprights 12, FIG. 7, which limit extension of the uprights 12 relatively to the primary uprights 11, are secured respectively to the front of the upper end of the primary uprights 11, and to the edge of the front flange of the secondary uprights 12, adjacent their lower ends.

The tertiary uprights 13 are provided with a cross brace 51 adjacent the lower ends thereof and a cross brace 52 adjacent their upper ends. Stops 35 which are engaged by stops 34 on the lift chains 16 during lowering of the uprights are secured to the lower cross brace 51, and the stops 28, which the guide member 26 of the upper header 27 of the ram 15 engage to lift the tertiary uprights, are formed by the lower surface of the cross brace 52. The stops 29 which limit upward movement of the load carriage 14 relatively to the tertiary uprights 13 are secured to the upper ends of the uprights 13, as best seen in FIG. 7.

The tertiary uprights 13 are mounted for vertical movement relatively to the secondary uprights 12 in the well known manner through rollers 53 secured to the upper ends of the secondary uprights 12 and rollers 54 secured to the lower ends of the tertiary uprights 13 which ride in opposed channels of the uprights.

The stops 33 on the secondary uprights, through which the secondary uprights are lifted by the tertiary uprights, are formed by the lower surface of the cross brace 50 at the upper ends of the secondary uprights 12, while the stops 32 on the tertiary uprights 13, which cooperate with the stops 33 on the secondary uprights to effect lifting of the secondary uprights by the tertiary uprights, are secured to the back of the tertiary uprights 13 adjacent the lower ends thereof, as best shown in FIG. 7.

Referring now to FIG. 6, the lower header 24, which is secured to the cylinder 17 of the ram adjacent the lower end of the cylinder, is provided with integral stub shafts or hubs 55 on which the lower sheaves 21 are mounted for rotation. The guide members 25, through which the lower end of the ram 15 is guided for vertical movement, are pivotally mounted and secured to the outer ends of the stub shafts or hubs 55 through pins 56 which are secured to the stub shafts 55 and extend through oversized holes 57 in the guide members 25. Because of this oversized relationship between the pins 56 and the holes 57, the guide members 25 may pivot on the stub shafts 55 relatively to the ram cylinder 17. The outer ends 25a of the guide members 25 are bifurcated and extend around the edge of vertical guide plates 58 which are welded, or otherwise secured, to the lower ends of the secondary uprights 12, as best shown in FIG. 7.

As best shown in FIG. 5, the header member 26, which is secured to the upper end of the innermost piston 19, is also provided with stub shafts or hubs 59 through which the upper sheaves 20 are mounted for rotation, and the guide members 27 are mounted on the outer ends of the stub shafts 59 through pins 60 which are secured to the stub shafts 59 and extend through oversized holes 61 through the guide member 27. The oversized relationship between the pins 60 and the holes 61 allows the guide members to pivot relatively to the piston 19. The outer ends 27a of the guide members 27 are bifurcated and extend around the edge of vertically extending guide plates 62 which are secured to the tertiary uprights adjacent the upper ends thereof, as best shown in FIG. 7.

The upper and lower guide members 25 and 27, in cooperation with the guide plates 58 and 62, therefore, serve to guide the upper and lower ends of the ram 15 during extension of the ram and relative vertical movement between the ram and the uprights. As previously described, the pivotal connection of the guide members 25 and 27 to headers 24 and 26 of the ram prevents the ram from being subjected to lateral forces that would in effect apply loads eccentric to the ram axis. This decreases wear of the ram and materially increases the ram life.

As best shown in FIGS. 3 and 4, the stops 34 on the chains 16, which are engaged by the stops 35 on the tertiary uprights 13, are conveniently formed by nut members which are adjustably threaded on rigid links 63 of the chains 16. As best shown in FIGS. 3, and 5, the rigid links extend slidably through slots 35a in the stops 35. The slots 35a are wider than the links 63 but smaller than the nuts 34 so that the nuts 34 cannot pass through the slots 35a.

Referring now to FIGS. 3 and 4, the latch member 30, through which the upper header 26 of the ram 15 is latched to the tertiary uprights 13, is pivotally mounted at 64 to the upper cross brace 52 of the tertiary uprights 13, and is spring-urged in a counterclockwise direction, as viewed in FIG. 3, by a compression spring 65 which extends between the under surface of cross brace 52 and an arm 30a of the latch member 30.

When the uprights are in the lowered position, the latch member 30 is held in the non-latching position, as shown in FIG. 3, by engagement of arm 30a with a stop member 66 which is secured to the upper cross brace 45 of the primary uprights 11. When the tertiary uprights 13 are elevated relatively to the primary uprights 11, the spring 65 urges the latch member 30 in the counterclockwise direction to engage the hooked end thereof under the upper header member 26, whereby the upper end of the piston 19 of the ram 15 is latched to the tertiary uprights 13, as shown in FIG. 4.

Referring now to FIGS. 14–18, the feature of the invention, wherein the lift ram is mounted for bodily vertical movement relatively to the uprights, is shown applied to a truck incorporating only two sets of uprights, including primary uprights 66 and secondary uprights 67.

The primary uprights 66 are of essentially the same construction and are mounted on the truck in the same manner as the primary uprights 11 of the truck shown in FIG. 1. Like the primary uprights of the truck of FIG. 1, the primary uprights 66 of FIG. 14 have a stop member 68 secured to a tubular cross brace adjacent the lower end of the uprights, which limits downward movement of the lift ram, and also brackets 70, which are secured to a tubular cross brace 71 at the upper end of the uprights 66, and to which one end of lift chains 72 are secured.

The secondary uprights 67 are of essentially the same construction as the tertiary uprights 13 of the truck of FIG. 1, and include a latch member 73 at the upper ends thereof which functions in the same manner as the latch member 30 of the tertiary uprights 13 of the truck of FIG. 1, to connect the upper end of the lift ram to the upper end of the uprights 67, when the uprights 67 are elevated, so that the secondary uprights 67 must move downwardly with the ram during lowering of the uprights. The latch 73 is held against pressure of its spring by engagement with the primary uprights, and cannot engage the upper ends of the lift ram until the lift ram raises the secondary uprights.

Figure 14:
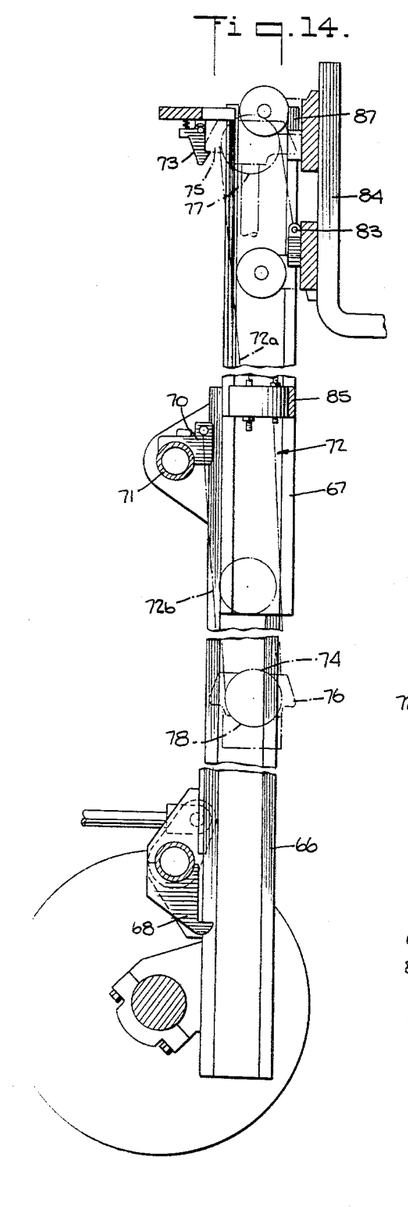
FIG. 14 is a sectional view through the uprights and load carriage of a truck constructed in accordance with the invention having only two sets of uprights; the uprights and load carriage being shown in the fully elevated position.
Figure 15:
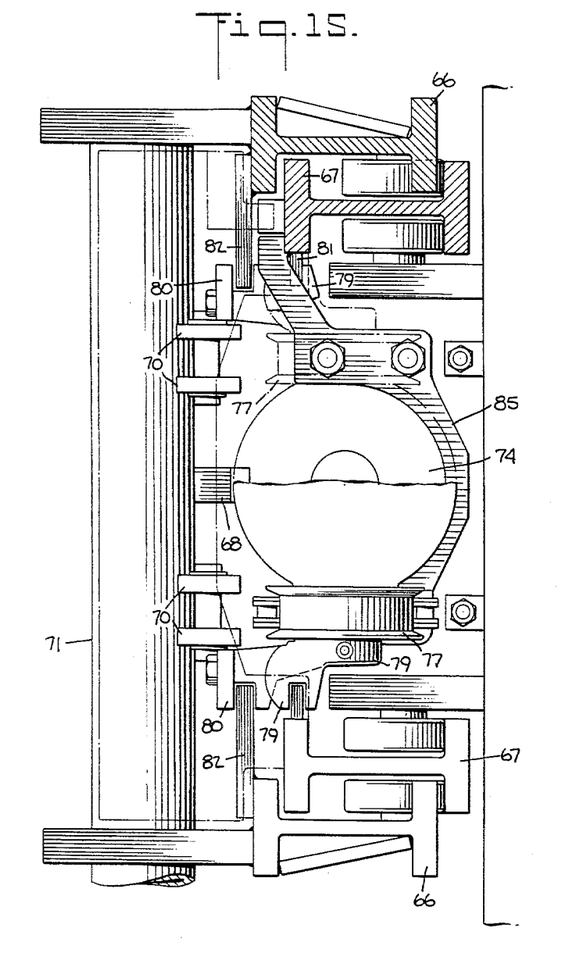
FIG. 15 is a top plan view with parts broken away, of the truck shown in FIG. 14.

The lift ram of the truck of FIG. 14, generally designated by the reference numeral 74, is also of the same construction as the lift ram 15 of the truck of FIG. 1, and includes upper and lower header members 75 and 76, similar to the header members 26 and 24 on the lift ram 15 of the truck of FIG. 1. Upper and lower sheaves 77 and 78 are rotatably mounted on the headers 75 and 76, and upper and lower guide members 79 and 80, best shown in FIG. 15, are pivotally attached respectively to the upper and lower headers 75 and 76, in the same manner as described in conjunction with the guide members 27 and 25 of the ram of the truck of FIG. 1. As shown in FIG. 15, the upper guide members 79 cooperate with guide plates 81 secured to a flange of the secondary uprights 67, while the lower guide members 80 cooperate with vertical guide plates 82 secured to the back of the primary uprights 66, to guide and hold the ram vertical during vertical bodily movement of the ram relatively to the uprights.

The lift chains 72 are preferably made in two parts including parts 72a which extend around the upper sheaves 77 and parts 72b which extend around the lower sheaves 78. One end of the parts 72a of the lift chains 72 are connected at 83 to the load carriage 84, which is mounted for vertical movement on the secondary uprights 67. The opposite ends of the parts 72a are adjustably anchored at the other end to a bracket 85, which is secured to the secondary uprights 67 intermediate their ends. The ram 74 is free to move relatively to the bracket member 85.

The other parts 72b of the lift chains 72 are adjustably anchored at one end to the bracket 85, extend down around the lower sheaves 78 on the header member 76, and are anchored at the opposite ends to the brackets 70. It should be pointed out that the lift chains 72 can be made continuous, in which case the brackets 85 would be eliminated. However, the making of the lift chains in two parts, with the ends of the two parts adjustably anchored to the bracket 85, allows the chains to be easily assembled and adjusted in length.

Figures 16, 17:
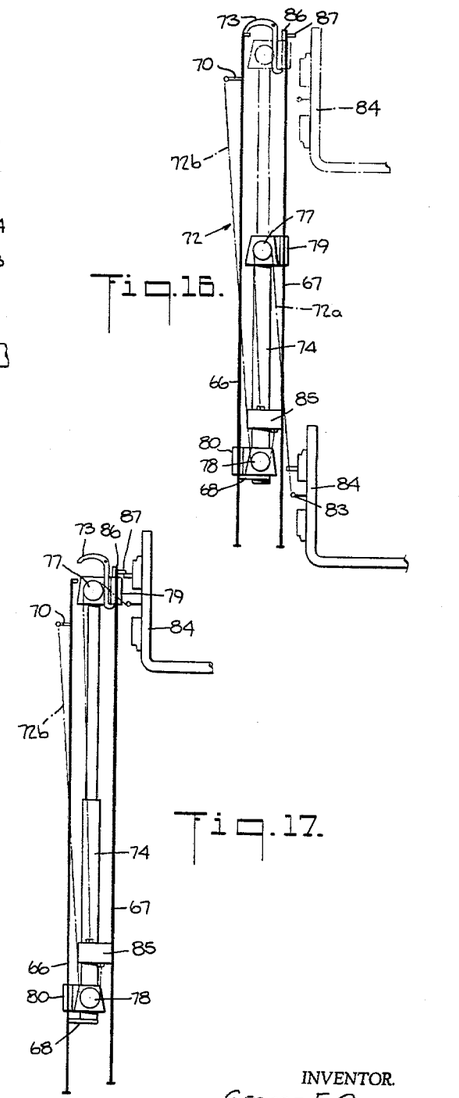
FIG. 16 is a schematic drawing of the uprights, load carriage, lift ram and lift chains of the truck shown in FIG. 14, showing the uprights and load carriage in the lowered position in solid lines and showing the load carriage in the free lift position in broken lines.
FIG. 17 is a drawing similar to FIG. 16, but showing the secondary uprights partially elevated.
Figure 16:
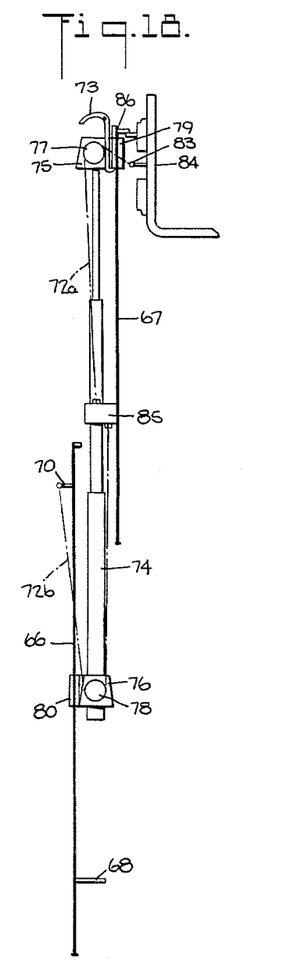

The action of the ram 74, as so mounted for vertical bodily movement, in elevating the secondary uprights 67 and the load carriage 84 through the lift chains 72 can be seen in the sequence diagram of FIGS. 16–18. Referring first to FIG. 16, the secondary uprights 67 and the load carriage 84 are shown in the lowered position in solid lines. In this position of the uprights and ram, the stop member 68 which is secured to the primary uprights 66 prevents the ram 74 from dropping below the uprights when the uprights are in the lowered position.

On initial extension of the ram 74, the load carriage 84 is elevated through the upper parts 72a of the lift chains 72 at twice the speed of extension of the ram, until the carriage 84 reaches the broken line position shown in FIG. 16. This represents the free lift position of the load carriage, inasmuch as the secondary uprights have not been elevated at this point.

In this position, the upper guide members 79 on the upper header 75 of the ram engage stops 86 which are secured to the upper ends of the secondary uprights 67, so that further extension of the ram 74 serves to lift the secondary uprights 67, at the same speed as the ram extends. At the same time, load carriage 84 is continued to be elevated through the upper parts 72a of the chain 72 at twice the speed of the ram until the carriage 84 contacts stops 87 secured to the top of the secondary uprights, as shown in FIG. 17.

As the secondary uprights 67 and load carriage 84 are elevated relatively to the primary uprights 66, the latch member 73 is released, as shown in FIG. 17, allowing the latch member 73 to move into latching or locking position relatively to the upper header member 75. Thus, at this point, the upper end of the ram 74 cannot be lowered independently of the secondary uprights 67.

On continued extension of the ram 74, the secondary uprights 67 and the load carriage 84 are elevated as a unit. As the load carriage 84 can no longer move upwardly relatively to the secondary uprights 67, this further extension of the ram also results in a simultaneous lifting of the ram 74 bodily through the parts 72b of the lift chain which extends around the lower sheaves 78. Thus, at this time, the load carriage 84 and the secondary uprights 67 are elevated at the speed of extension of the ram, plus the speed of the upwardly bodily movement of the ram, until the secondary uprights and load carriage reach the fully elevated position, as shown in FIG. 18.

It will be noted that the extension of the ram 75 at this time is in a downwardly direction relatively to the secondary uprights 67, this being made possible by the mounting of the ram for bodily vertical movement relatively to both the primary and secondary uprights. This downward extension of the ram 74 relatively to the secondary uprights can be seen in FIG. 18, wherein the lower end of the ram has extended below the lower ends of the secondary uprights. It will also be noted that the load carriage and secondary uprights are elevated in the proper sequence, regardless of the sequence in which the parts extend. For this reason, a simple type ram, as illustrated, may be used. Thus, full elevation of the secondary uprights may be effected without the upper end of the lift ram extending above the load carriage in the elevated position of the secondary uprights and the load carriage.

To lower the load carriage 84 and the secondary uprights 67, fluid pressure on the ram 74 is released so that the ram may contract. As the ram 74 contracts, the secondary uprights 67, being latched to the upper end of the ram 74 by the latch member 73, are pulled downwardly by the ram.

This downward movement of the secondary uprights 67 and the load carriage 84 continues until the secondary uprights, ram 74 and load carriage 84 reach the position as shown in broken lines in FIG. 16. At this time, the latch member 73 engages the upper ends of the primary upright 66, releasing the latch member 73 from the upper end of the ram 74, so that the ram 74 can contact further to allow the load carriage 84 to lower to the initial position shown in solid lines in FIG. 16.

From the preceding decription, it can be seen that there is provided a novel construction for a lift truck which may be applied to lift trucks incorporating three sets of uprights, or only two sets of uprights. In either case, the invention provides substantial free lift and also full lift of the uprights and load carriage, without the upper end of the ram extending above the load carriage in the elevated position. Thus, the full available length of the uprights may be used for lifting. When used in either a truck incorporating three sets of uprights or only two sets of upright, the invention ensures elevation of the uprights and load carriage in the proper sequence regardless of the sequence in which the prats of the ram extend. Thus, a simple form of ram, as illustrated, in which the pistons all extend from one end of the cylinder may be used.

While certain embodiments of the invention have been shown and described, it will be appreciated that these are for the purpose of illustration, and that changes and modifications may be made therein without departing from the spirit and scope of the invention.

I now claim:
1. In an industrial truck,
   primary uprights,
   extendible uprights mounted for vertical movement on said primary uprights,
   a load carriage mounted for vertical movement on said extendible uprights,
   a vertically extending lift ram,
   means mounting said ram for bodily vertical movement relatively to said primary and extendible uprights, and
   means interconnecting said ram and load carriage and uprights whereby extension of said ram lifts said carriage relatively to said uprights and then lifts said extendible uprights relatively to said primary uprights, and a portion of said interconnecting means through which the extending movement of said arm acts by moving the ram bodily downward relatively to the extendible uprights to effect a part of the lifting of those uprights.

2. In an industrial truck,
primary uprights,
extendible uprights mounted for vertical movement on said primary uprights,
a load carriage mounted for vertical movement on said extendible uprights,
a vertically extending lift ram,
upper and lower sheaves mounted on said lift ram adjacent opposite ends of said lift ram whereby extension of said lift ram moves said sheaves apart,
means mounting said ram for bodily vertical movement relatively to said primary and extendible uprights, including guide means pivotally mounted on said ram adjacent said upper and lower sheaves and slidably engaging said uprights for holding said ram vertical, and
means operatively connecting said sheaves, said uprights and said carriage whereby extension of said ram elevates said ram, said extendible uprights and said load carriage.

3. In an industrial truck,
primary uprights,
extendible uprights mounted for vertical movement on the primary uprights,
a load carriage mounted for vertical movement on the extendible uprights,
a vertically extending lift ram,
upper and lower sheaves mounted on said lift ram adjacent opposite ends of said lift ram whereby extension of said lift ram moves said sheaves apart,
means mounting said lift ram for bodily vertical movement relatively to said primary and extendible uprights, including guide members pivotally attached to said ram adjacent said sheaves and slidably engaging guide means on said uprights for holding said ram vertical during said bodily movement, and
a flexible lift element attached at one end to the load carriage, extending over said upper sheave, down around said lower sheave and anchored at the opposite end to the primary uprights adjacent the upper end thereof.

4. In an industrial truck,
primary uprights,
extendible uprights mounted for vertical movement on the primary uprights,
a load carriage mounted for vertical movement on the extendible uprights,
a vertical extending multiple piston lift ram having an unextended length substantially less than the unextended uprights,
upper and lower sheaves mounted on said lift ram adjacent opposite ends of said lift ram whereby extension of said lift ram moves said sheaves apart,
means mounting said lift ram for bodily vertical movement relatively to said primary and extendible uprights, including guide members pivotally attached to said ram adjacent said sheaves and slidably engaging guide means on said uprights for holding said ram vertical during said bodily movement, and
a flexible lift element attached at one end to the load carriage, extending over said upper sheave, down around said lower sheave, and anchored at the opposite end to the primary uprights adjacent the upper end thereof.

5. In an industrial truck,
primary uprights,
secondary and tertiary vertically extending uprights mounted for vertical movement on said primary uprights,
a load carriage mounted for vertical movement on the tertiary uprights,
a vertically extending lift ram,
upper and lower sheaves mounted on said lift ram adjacent opposite ends of said lift ram whereby extension of said lift ram moves said sheaves apart,
means mounting said lift ram for bodily vertical movement relatively to said primary, secondary and tertiary uprights,
a flexible lift element attached at one end to the load carriage, extending over said upper sheave, down around said lower sheave, and anchored at the opposite end to the primary uprights adjacent the upper end thereof, and
a lost motion connection between said tertiary uprights and the portion of said lifting element between said upper and lower sheaves whereby a downward force is applied to the portion of the flexible lift element between said lost motion connection and the end of the lifting element anchored to said primary uprights to assure bodily lowering of said ram during lowering of the uprights.

6. In an industrial truck,
primary uprights,
secondary and tertiary vertically extending uprights mounted for vertical movement on said primary uprights,
a load carriage mounted for vertical movement on the tertiary uprights,
a vertically extending multiple piston lift ram,
upper and lower sheaves mounted on said lift ram adjacent opposite ends of said lift ram whereby extension of said lift ram moves said sheaves apart,
means mounting said lift ram for bodily vertical movement relatively to said primary, secondary and tertiary uprights,
a flexible lift element attached at one end to the load carriage, extending over said upper sheave, down around said lower sheave, and anchored at the opposite end to the primary uprights adjacent the upper end thereof, and
a lost motion connection between said tertiary uprights and the portion of said lifting element between said upper and lower sheaves whereby a downward force is applied to the portion of the flexible lift element between said lost motion connection and the end of the lifting element anchored to said primary uprights to assure bodily lowering of said ram during lowering of the uprights.

7. In an industrial truck,
tiary uprights,
secondary and tertiary vertically extending uprights mounted for vertical movement on said primary uprights,
a load carriage mounted for vertical movement on the tertiary uprights,
a vertical extending lift ram,
upper and lower sheaves mounted on said lift ram adjacent opposite ends of said lift ram whereby extension of said lift ram moves said sheaves apart,
means mounting said lift ram for bodily vertical movement relatively to said primary, secondary and tertiary uprights,
a flexible lift element attached at one end to the load carriage, extending over said upper sheave, down around said lower sheave and anchored at the opposite end to the primary uprights adjacent the upper end thereof,
cooperating latch means on the upper end of said ram and the upper end of said tertiary uprights for connecting said upper end of said ram to said tertiary uprights when said tertiary uprights are extended whereby said tertiary uprights are pulled downwardly by said ram during lowering of the uprights,
a lost motion connection between the tertiary uprights and the portion of said lift element which extends between said upper and lower sheaves whereby a downward force is applied to the portion of the flexible lift element between said lost motion connection and the end of the lift element anchored to said primary uprights, to insure bodily lowering of said ram during lowering of said uprights, and cooperating means on said secondary uprights and said ram whereby the weight of the ram, tertiary uprights and load are transmitted to the secondary uprights to insure lowering of the secondary uprights during lowering of the tertiary uprights and ram.

8. In an industrial truck, primary uprights, secondary and tertiary vertically extending uprights mounted for vertical movement on said primary uprights, a load carriage mounted for vertical movement on the tertiary uprights, a vertically extending multiple piston lift ram having an unextended length substantially less than that of the unextended uprights, upper and lower sheaves mounted on said lift ram adjacent opposite ends of said lift ram whereby extension of said lift ram moves said sheaves apart, means mounting said lift ram for bodily vertical movement relatively to said primary, secondary and tertiary uprights, a flexible lift element attached at one end to the load carriage, extending over said upper sheave, down around said lower sheave, and anchored at the opposite end to the primary uprights adjacent the upper end thereof, cooperating latch means on the upper end of said ram and the upper end of said tertiary uprights for connecting said upper end of said ram to said tertiary uprights when said tertiary uprights are extended whereby said tertiary uprights are pulled downwardly by said ram during lowering of the uprights, a lost motion connection between the tertiary uprights and the portion of said lift element which extends between said upper and lower sheaves whereby a downward force is applied to the portion of the flexible lift element between said lost motion connection and the end of the lift element anchored to said primary uprights, to insure bodily lowering of said ram during lowering of said uprights, and cooperating means on said secondary uprights and said ram whereby the weight of the ram, tertiary uprights and load are transmitted to the secondary uprights to insure lowering of the secondary uprights during lowering of the tertiary uprights and ram.

9. In an industrial truck, primary uprights, secondary and tertiary uprights mounted for vertical movement on said primary uprights, a load carriage mounted for vertical movement on said tertiary uprights, a vertically extending lift ram, flexible lift means actuated by said ram for lifting said carriage relatively to said tertiary uprights and for lifting said tertiary uprights relatively to said secondary uprights and said secondary uprights relatively to said primary uprights, reeving means for said flexible lift means whereby said ram is bodily supported by said flexible lift means for bodily vertical movement relatively to said uprights so that the ram may move bodily relatively to all the uprights, said reeving means actuating said flexible means upon extension of said ram whereby initial extension of said ram elevates said carriage relatively to said tertiary uprights and further extension of said ram effects lifting of said tertiary uprights, secondary uprights and load carriage relatively to said primary uprights, and including means through which the extending movement of the lift ram acts by moving the ram bodily downward on the flexible lift means relatively to the secondary uprights to effect a part of the lifting of those uprights.

10. In an industrial truck, primary uprights, secondary and tertiary extendible uprights mounted for vertical movement on said primary uprights, a load carriage mounted for vertical movement on said tertiary uprights, a lift ram mounted for bodily vertical movement relatively to said uprights, flexible lift means secured relatively to said uprights and carriage and having a portion extending under said ram for supporting said ram bodily relatively to said uprights, means operative upon extension of said ram for actuating said flexible lift means as said ram extends whereby to effect lift of said carriage relatively to said uprights and of said tertiary uprights relatively to said secondary uprights and said secondary uprights relatively to said primary uprights, and said flexible means being so secured and so directed relatively to said uprights, carriage and ram whereby during the extending movement of the lift ram said ram moves bodily downward on said portion of the flexible lift means relatively to the secondary uprights to effect a part of the lifting of those uprights.

11. In an industrial truck, primary uprights, secondary and tertiary extendible uprights mounted for vertical movement on said primary uprights, a load carriage mounted for vertical movement on said tertiary uprights, a vertically extending lift ram having a sheave at the lower end thereof, means mounting said ram for bodily vertical movement relatively to said uprights, flexible lift means secured relatively to said carriage and uprights and having a portion extending under said sheave to support said ram relatively to said uprights, means including said sheave operative by extension of said ram for actuating said flexible lift means to lift said carriage relatively to said secondary uprights and to lift said secondary uprights and tertiary uprights relatively to one another and relatively to said primary uprights, said flexible means being so secured and so directed relatively to said uprights, carriage and ram whereby during the extending movement of the lift ram said ram moves bodily downward on said portion of the flexible lift means relatively to the secondary uprights to effect a part of the lifting of those uprights, and means on said primary uprights accepting the initial lift reaction of said ram for lifting said carriage relatively to said uprights.

12. In an industrial truck, primary uprights, secondary and tertiary extendible uprights mounted for vertical movement on said primary uprights, a load carriage mounted for vertical movement on said uprights, a vertically extending lift ram, upper and lower sheaves mounted on said lift ram adjacent opposite ends of said lift ram whereby extension of said lift ram moves said sheaves apart, means mounting said ram for bodily vertical movement relatively to said uprights, flexible lift means operatively connecting said sheaves, said uprights and said carriage and effective through said lower sheave to support and to move said ram bodily, said sheaves when moving apart actuating the flexible lift means to lift said carriage and said extendible uprights and also to move the lift ram bodily upward, and said flexible means being so secured and so directed relatively to said uprights, carriage and ram whereby during the extending movement of the lift ram said ram moves bodily downward on said portion of the flexible lift means relatively to the secondary uprights to effect a part of the lifting of those uprights.

13. In an industrial truck, primary uprights, secondary and tertiary vertically extending telescoping uprights mounted for vertical movement relatively to said primary uprights, a load carriage mounted for vertical movement on the tertiary uprights, a vertically extending lift ram, upper and lower sheaves mounted on said lift ram adjacent opposed ends of said lift ram whereby extension of said lift ram moves said sheaves apart, a flexible lift element coacting with said sheaves and secured relatively to said uprights and carriage for supporting said ram through said lower sheave, limit means limiting bodily downward movement of said ram relatively to said primary uprights when said secondary and tertiary uprights and said carriage are in a lowered position whereby said limit means accept the thrust of said ram so that the first extension of said ram lifts said carriage through said flexible lift element relatively to said tertiary uprights, means whereby continued extension of said ram lifts said secondary and tertiary uprights while said ram itself is bodily lifted through said flexible element relatively to said primary uprights incidental to the extension of said ram, and the final lifting of said secondary uprights carrying the lower ends of said secondary uprights above the lower end of said ram as said ram is bodily lifted by said flexible lift element relatively to said primary uprights to contribute extreme high lift of the load carriage.

14. In an industrial truck, primary uprights, secondary and tertiary vertically extending telescoping uprights mounted for vertical movement relatively to said primary uprights, a load carriage mounted for vertical movement on the tertiary uprights, a vertically extensible lift ram movable bodily in a vertical direction relatively to said uprights, upper and lower sheaves mounted on said lift ram adjacent opposed ends of said lift ram whereby extension of said lift ram moves said sheaves apart, a flexible lift element attached at one end to the load carriage, extending over said upper sheave, down around said lower sheave, and anchored at its opposite end to the primary uprights, said flexible element effective through the lower sheave for supporting the lift ram bodily, limit means limiting bodily downward movement of said ram on said flexible element relatively to said primary uprights when said secondary and tertiary uprights and said carriage are in a lowered position, whereby said limit means accept the thrust of said ram so that the first extension of said ram lifts said carriage relatively to said tertiary uprights, means whereby said load carriage when lifted by said extension of said ram lifts said tertiary uprights after predetermined lift relatively to said tertiary uprights, means whereby said tertiary uprights thereafter lift said secondary uprights relatively to said primary uprights upon continued extension of said ram while said ram itself is bodily lifted through said flexible element relatively to said primary uprights incidental to the extension of said ram, and the final lifting of said secondary uprights carrying the lower ends of said secondary uprights above the lower end of said ram as said ram is bodily lifted by said flexible lift element relatively to said primary uprights to contribute extreme high lift of the load carriage.

15. In an industrial truck, primary uprights, secondary and tertiary vertically extending telescoping uprights mounted for vertical movement relatively to said primary uprights, a load carriage mounted for vertical movement on the tertiary uprights, a vertically extensible lift ram, upper and lower sheaves mounted on said lift ram adjacent opposed ends of said lift ram whereby extension of said lift ram moves said sheaves apart, a flexible lift element coacting with said sheaves and secured relatively to said uprights and carriage for supporting the ram through said lower sheave, limit means limiting bodily downward movement of said ram on said flexible element relatively to said primary uprights when said secondary and tertiary uprights and said carriage are in a lowered position, whereby said limit means accept the thrust of said ram so that the first extension of said ram lifts said carriage through said flexible element relatively to said tertiary uprights, means limiting the movement of the upper sheave relatively to the tertiary uprights so that further ram extension moves the lower sheave to lift the ram bodily on the flexible lift element while further lifting the carriage and tertiary uprights, means whereby said continued extension of said lift ram lifts said secondary uprights relatively to said primary uprights with the final lifting of said secondary uprights carrying the lower ends of said secondary uprights above the lower end of said ram as said ram is bodily lifted by said flexible lift element relatively to said primary uprights to contribute extreme high lift of the load carriage.

References Cited by the Examiner

UNITED STATES PATENTS

| 2,419,938 | 5/1947 | Abbe | 187—9 |
| 2,518,251 | 8/1950 | Quayle | 187—9 |
| 2,918,143 | 12/1951 | Shaffer | 187—9 |

SAMUEL F. COLEMAN, *Primary Examiner.*

F. DUFFIELD, *Assistant Examiner.*